United States Patent Office 3,318,883
Patented May 9, 1967

3,318,883
NOVEL DIHYDROTHIENO[3,2-d]PYRIMIDINES
Gerhard Ohnacker and Eberhard Woitun, Biberach an der Riss, Germany, assignors to Boehringer Ingelheim G.m.b.H., Ingelheim (Rhine), Germany, a corporation of Germany
No Drawing. Filed June 8, 1964, Ser. No. 373,565
Claims priority, application Germany, July 4, 1962, T 22,407
6 Claims. (Cl. 260—247.1)

This is a continuation-in-part of copending application Ser. No. 288,491, filed June 17, 1963, now United States Patent No. 3,272,811.

This invention relates to novel substitution products of dihydrothieno[3,2-d]pyrimidine and to acid addition salts thereof, as well as to various methods of preparing these compounds.

More particularly, the present invention relates to novel dihydrothieno[3,2-d]pyrimidine substitution products of the formula

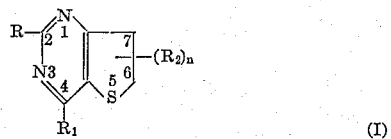

wherein
R is a free mercapto or free amino group,
$R_1$ is hydrogen, lower alkoxy-lower alkoxy, monoalkylamino-lower alkoxy, dialkylamino-lower alkoxy, aralkoxy, lower alkyl-mercapto, arylmercapto, aralkyl-mercapto, carbalkoxy-lower alkyl-mercapto, monoalkylaminoalkyl - mercapto, dialkyl-aminoalkyl - mercapto, amino or a substituent of the formula

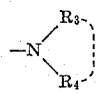

wherein $R_3$ is amino, phenylamino, lower alkyl, hydroxy-lower alkyl, lower alkoxy-lower alkyl, lower alkyl-thio-lower alkyl, halo-lower alkyl, amino-lower alkyl, mono-alkylamino-lower alkyl, dialkylamino-lower alkyl, lower alkenyl, aralkyl, cycloalkyl or pyridyl.
$R_4$ is hydrogen, lower alkyl or hydroxy-lower alkyl, or
$R_3$ and $R_4$, together with each other and the adjacent nitrogen atom, form a basis heterocycle whose methylene chain may be interrupted by additional heteroatoms, such as oxygen, nitrogen and sulfur, and which may have lower alkyl or aryl substituents attached thereto,
$R_2$ is lower alkyl or aryl, where the aryl radical may have halogen, lower alkyl, lower alkoxy, amino, monoalkylamino or dialkylamino substituents attached thereto, and
$n$ is an integer from 0 to 2, inclusive, and their non-toxic, pharmacologically acceptable acid addition salts.

The compounds of the present invention may be prepared by reacting a dihydrothieno[3,2-d]pyrimidine of the formula

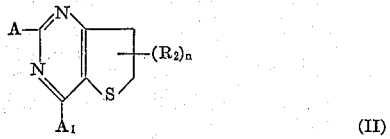

wherein $R_2$ and $n$ have the same meanings as in Formula I, and one of substituents A and $A_1$ is halogen or a free or lower alkyl-substituted mercapto group, and the other of substituents A and $A_1$ is halogen, mercapto, lower alkyl mercapto or has any of the other meanings included in the definition of R and $R_1$ in Formula I above, with a compound of the formula $$R_5H \qquad (III)$$

wherein $R_5$ is lower alkoxy-lower alkoxy, monoalkylamino-lower alkoxy, dialkylamino-lower alkoxy, aralkoxy, lower alkyl-mercapto, aralkyl-mercapto, aryl-mercapto, carbalkoxy-lower alkyl-mercapto, monoalkylaminoalkyl-mercapto, dialkylaminoalkyl-mercapto, amino or

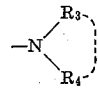

wherein $R_3$ and $R_4$ have the meanings defined above in connection with Formula I.

The reaction is advantageously performed in the presence of an inert organic solvent and at temperatures between 0 and 200° C. If one or both of substituents A and $A_1$ are halogen, it is necessary that the reaction be performed in the presence of a compound capable of tying up or neutralizing the hydrogen halide released by the reaction, for instance, in the presence of an inorganic base or a tertiary organic base. If $R_5$ in Compound III is a free amino group or a basic radical

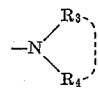

Compound III itself may serve as the agent for tying up the hydrogen halide; under these circumstances Compound III must, however, be provided in excess over the stoichiometric amount required for reaction with Compound II, preferably at least one molar excess. A still greater excess of this amine may also serve as the organic solvent medium for the reaction.

The reaction temperature depends largely upon the reactivity of the reactants. In general, the reaction involving the exchange of a halogen for any of the other indicated groups in the presence of a compound capable of tying up the hydrogen halide proceeds at room temperature or moderately elevated temperatures. On the other hand, if the reaction involves the exchange of a mercapto group for a substituent of the formula

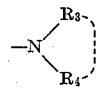

the reaction proceeds at temperatures between 100 and 200° C. If Compound III is one having a relatively low boiling point, the reaction is advantageously performed in a closed vessel.

In the event that $R_5$ in Compound III is substituted hydroxyl or mercapto, it is advantageous to react Compound III with a compound of the Formula II wherein A and/or $A_1$ are halogen.

If it is desired to prepare a compound of the Formula I wherein R and $R_1$ are both amino, the starting Compound II wherein A and $A_1$ are any of the above exchangeable radicals is reacted with twice the molar equivalent or a larger excess of Compound III. However, it is also possible ao introduce non-identical substituents R and $R_1$, for instance, by first exchanging $A_1$ for $R_1$ and then A for R on the dihydrothieno[3,2-d]pyrimidine nucleus.

Compounds of the Formula II, which are used as starting materials, may be prepared by Method A of copending application Ser. No. 288,491. If substituents A and/or $A_1$ in Formula II are mercapto or lower alkyl-mercapto, these compounds may be obtained directly by ring closure, for instance, by reacting a 3-imino-tetrahydrothiophene-2-carboxylic acid thioamide with thiourea. If one or both of substituents A and $A_1$ are to be halogen, a 3-ketotetrahydrothiophene-2-carboxylic acid ester is first subjected to a ring closure reaction with urea to form the corresponding 2,4 - dihydroxy - dihydrothieno[3,2 - d]-pyrimidine, which is then transformed into the corresponding 2,4-dihalo-dihydrothieno[3,2-d]pyrimidine, for example, with phosphorusoxychloride. The analogous 2,4-dimercapto compounds may also be obtained from the above-mentioned 2,4-dihydroxy-dihydrothieno[3,2-d]pyrimidines, namely, either by reacting the 2,4-dihydroxy compounds with phosphoruspentasulfide and subsequent alkylation, or through the 2,4-dihalo compounds by reacting the latter with thiourea, an alkali metal hydrosulfide or an alkali metal mercaptide.

If the reaction product of the above described method is a compound of the Formula I wherein R is a free amino group and $R_1$ is a mercapto group, the latter may subsequently be exchanged for hydrogen by known methods, for instance, by hydrogenation in the presence of Raney nickel.

Compounds of the Formula I wherein one, two or all three of substituents R, $R_1$ and $R_2$ are or comprise basic radicals, that is, amino, substituted amino or basic heterocycles, may be readily converted into their acid addition salts by customary methods, namely, by dissolving the free base in a suitable solvent and acidifying the solution with the desired acid. Similarly, compounds of the Formula I wherein the substituents are free mercapto groups may be converted into their alkali metal salts.

The following examples further illustrate the present invention and will enable others skilled in the art to understand the invention more completely. It should be understood, however, that the present invention is not limited solely to the illustrative examples given below.

EXAMPLE 1

*Preparation of 2-amino-4-morpholino-dihydrothieno [3,2-d] pyrimidine*

A mixture of 3.75 gm. (0.02 mol) of 2-amino-4-chloro-dihydrothieno[3,2-d]pyrimidine and 30 cc. of morpholine was refluxed for three hours on an oil bath at 150° C. (bath temperature). Thereafter, the clear reaction solution was allowed to cool and was then poured into water. A precipitate formed, which was separated by vacuum filtration, washed with water and recrystallized from ethanol. 3.75 gm. (79% of theory) of a white crystalline substance having a melting point of 170–172° C. were obtained. It was identified to be the compound of the formula

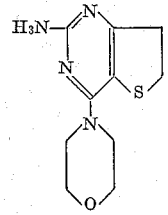

*Analysis.*—$C_{10}H_{14}N_4OS$; molecular weight 238.32. Calculated: C, 50.40%; H, 5.92%; S, 13.46%. Found: C, 50.42%; H, 5.95%; S, 13.54%.

Using a procedure analogous to that described above, the following additional 2-amino-dihydrothieno[3,2-d]pyrimidines were prepared:

(a) 2-amino - 4 - (N'-methyl-piperazino)-dihydrothieno [3,2-d] pyrimidine from 2-amino-4-chloro-dihydrothieno [3,2-d] pyrimidine and N-methyl-piperazine. Recrystallized from ethanol, the product had a melting point of 179–180° C. The yield was 46% of theory.

(b) 2 - amino - 4 - pyrrolidino-dihydrothieno[3,2-d] pyrimidine from 2-amino-4-chloro-dihydrothieno[3,2-d] pyrimidine and pyrrolidine. Recrystallized from ethanol, the product had a melting point of 160–161° C. The yield was 54% of theory.

(c) 2 - amino - 4 - cyclohexylamino-dihydrothieno[3, 2-d]pyrimidine from 2-amino-4-chloro-dihydrothieno[3, 2-d]pyrimidine and cyclohexylamine. Recrystallized from ethyl acetate, the product had a melting point of 117–118° C. The yield was 44% of theory.

(d) 2 - amino - 4 - (ethyl-benzylamino)-dihydrothieno [3,2-d]pyrimidine from 2-amino-4-chloro-dihydrothieno [3,2-d]pyrimidine and ethyl-benzylamine. Recrystallized from gasoline, the product had a melting point of 114–115° C. The yield was 38% of theory.

(e) 2 - amino - 4 - isoamylamino-dihydrothieno[3,2-d] pyrimidine from 2-amino-4-chloro-dihydrothieno[3,2-d] pyrimidine and isoamylamine. Recrystallized from gasoline, the product had a melting point of 126–127° C. The yield was 55% of theory.

(f) 2 - amino - 4 - ethanolamino-dihydrothieno[3,2-d] pyrimidine from 2-amino-4-chloro-dihydrothieno[3,2-d] pyrimidine and ethanolamine. Recrystallized from ethanol, the product had a melting point of 88–90° C. The yield was 74% of theory.

(g) 2 - amino - 4 - (methyl - ethanolamino) - dihydrothieno[3,2-d]pyrimidine from 2-amino-4-chloro-dihydrothieno[3,2-d]pyrimidine and methyl-ethanolamine. Recrystallized from methyl ethyl ketone, the product had a melting point of 105–106° C. The yield was 45% of theory.

(h) 2 - amino - 4 - [(γ - dimethylamino - n - propyl)-amino]-dihydrothieno[3,2-d]pyrimidine from 2-amino-4-chloro-dihydrothieno[3,2-d]pyrimidine and (γ-dimethylamino-n-propyl)-amine. Recrystallized from methyl ethyl ketone, the product had a melting point of 101–102° C. The yield was 34% of theory.

(i) 2 - amino - 4 - [(γ-methoxy-n-propyl)-amino]-dihydrothieno[3,2-d]pyrimidine from 2-amino-4-chloro-dihydrothieno[3,2-d]pyrimidine and (γ-methoxy-n-propyl)-amine. Recrystallized from 90% methanol, the product had a melting point of 103–104° C. The yield was 42% of theory.

(j) 2 - amino - 4 - (2'-methyl-morpholino)-7-methyl-dihydrothieno[3,2-d]pyrimidine from 2-amino-4-chloro-7-methyl - dihydrothieno[3,2-d]pyrimidine and 2 - methyl-morpholine. Recrystallized from ethyl acetate, the product had a melting point of 146–148° C. The yield was 41% of theory.

(k) 2 - amino - 4 - piperidino-7-methyl-dihydrothieno [3,2-d]pyrimidine from 2-amino-4-chloro-7-methyl-dihydrothieno[3,2-d]pyrimidine and piperidine. Recrystallized from ethyl acetate, the product had a melting point of 143–144° C. The yield was 48% of theory.

(l) 2 - amino - 4 - benzylamino-7-methyl-dihydrothieno [3,2-d]pyrimidine from 2-amino-4-chloro-7-methyl-dihydrothieno[3,2-d]pyrimidine and benzylamine. Recrystallized from methanol, the product had a melting point of 109–111° C. The yield was 43% of theory.

EXAMPLE 2

*Preparation of 2-amino-4-methylamino-7-methyl-dihydrothieno[3,2-d]pyrimidine*

A mixture of 4 gm. (0.02 mol) of 2-amino-4-chloro-7-methyl-dihydrothieno[3,2-d]pyrimidine and 50 cc. of liquid methylamine was heated for five hours in a closed vessel on an oil bath at 140° C. (bath temperature). Thereafter, the reaction mixture was allowed to cool, the excess methylamine was exhausted from the vessel, the crystalline residue was triturated with water, and the mixture was vacuum filtered. The filter cake was recrystallized from ethyl acetate. 1.5 gm. (38% of theory) of a white crystalline substance having a melting point of 157–159° C. were obtained. It was identified to be the compound of the formula

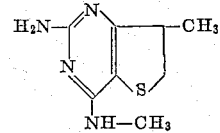

*Analysis.*—C₈H₁₂N₄S; molecular weight 196.28. Calculated: C, 48.95%; H, 6.16%; S, 16.34%. Found: C, 48.81%; H, 6.19%; S, 16.37%.

Using a procedure analogous to that described above, the following additional 2 - amino - dihydrothieno[3,2-d]pyrimidines were prepared:

(a) 2,4 - diamino - dihydrothieno[3,2 - d]pyrimidine from 2 - amino-4-chloro - dihydrothieno[3,2-d]pyrimidine and ammonia. Recrystallized from ethanol, the product had a melting point of 229–231° C. The yield was 47% of theory.

(b) 2 - amino - 4 - ethylamino - dihydrothieno[3,2-d]pyrimidine from 2-amino-4-chloro-dihydrothieno[3,2-d]pyrimidine and ethylamine. Recrystallized from ethylacetate, the product had a melting point of 82–83° C. The yield was 54% of theory.

(c) 2 - amino - 4 - n-propylamino-dihydrothieno[3,2-d]pyrimidine from 2-amino-4-chloro-dihydrothieno[3,2-d]pyrimidine and n-propylamine. Recrystallized from a mixture of gasoline and ethylacetate, the product had a melting point of 120–121° C. The yield was 49% of theory.

(d) 2 - amino - 4 - allylamino - dihydrothieno[3,2-d]pyrimidine from 2 - amino-4-chloro-dihydrothieno[3,2-d]pyrimidine and allylamine. Recrystallized from ethylacetate, the product had a melting point of 140–141° C. The yield was 38% of theory.

(e) 2-amino - 4 - isopropylamino-dihydrothieno[3,2-d]pyrimidine from 2 - amino-4-chloro-dihydrothieno[3,2-d]pyrimidine and isopropylamine. Recrystallized from ethylacetate, the product had a melting point of 195–196° C. The yield was 70% of theory.

(f) 2 - amino - 4 - diethylamino-dihydrothieno[3,2-d]pyrimidine from 2 - amino-4-chloro-dihydrothieno[3,2-d]pyrimidine and diethylamine. Recrystallized from gasoline, the product had a melting point of 99—100° C. The yield was 63% of theory.

(g) 2-amino-4-diethylamino - 7 - methyl-dihydrothieno[3,2-]pyrimidine from 2-amino-4-chloro-7-methyl-dihydrothieno[3,2-d]pyrimidine and diethylamine. Recrystallized from ethylacetate, the product had a melting point of 112–114° C. The yield was 48% of theory.

EXAMPLE 3

*Preparation of 2-amino-4-isobutylamino-7-methyl-dihydrothieno[3,2-d]pyrimidine hydrochloride*

A solution of 1.2 gm. (0.005 mol) of 2-amino-4-isobutylamino-7-methyl - dihydrothieno[3,2-d]pyrimidine in 50 cc. of absolute ether was admixed with ethereal hydrochloric acid until the solution was acid to Congo Red. The precipitate formed thereby was separated by vacuum filtration, washed with absolute ether and recrystallized from absolute ethanol. 1.1 gm. (80% of theory) of a white crystalline substance having a melting point of 223—225° C. were obtained which was identified to be the compound of the formula

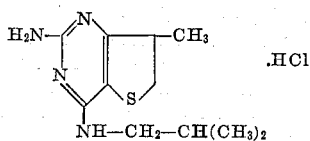

*Analysis.*—C₁₁H₁₉ClN₄S; molecular weight 274.83. Calculated: C, 48.08%; H, 6.97%; Cl, 12.90%. Found: C, 48.10%; H, 7.01%; Cl, 12.76%.

(a) Using a procedure analogous to that described above, 2-amino-4-diethanolamino - 7 - methyl-dihydrothieno[3,2-d]pyrimidine hydrochloride was prepared from the free base and ethereal hydrochloric acid. The salt had a melting point of 193–195° C. after recrystallization from ethanol.

EXAMPLE 4

*Preparation of 2-amino-4-hydrazino-7-methyl-dihydrothieno[3,2-d]pyrimidine*

4.0 gm. (0.02 mol) of 2-amino-4-chloro-7-methyl-dihydrothieno[3,2-d]pyrimidine were dissolved in 50 cc. of ethanol. Thereafter, 50 cc. of 80% hydrazine hydrate were added to the solution, and the mixture was refluxed for four hours. The reaction solution was then evaporated in vacuo, the viscous residue was taken up in chloroform, and the resulting solution was dried over sodium sulfate. After evaporation of the solvent in vacuo a crystalline residue was obtained, which was recrystallized from ethanol. 1.8 gm. (46% of theory) of a white crystalline substance having a melting point of 158—159° C. were obtained, which was identified to be the compound of the formula

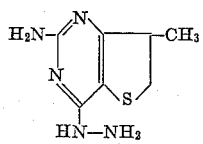

*Analysis.*—C₇H₁₁N₅S; molecular weight 197.27. Calculated: C, 42.61%; H, 5.62%; S, 16.25%. Found: C, 42.40%; H, 5.66%; S, 16.28%.

EXAMPLE 5

*Preparaion of 2-amino-4-(2'-ethoxy-ethoxy)-dihydrothieno[3,2-d]pyrimidine*

4.0 gm. (0.0214 mol) of 2-amino-4-chloro-dihydrothieno[3,2-d]pyrimidine were added to a solution of 0.7 gm. (0.03 gm.-atom) of sodium in 50 cc. of absolute 2-ethoxy-ethanol, and the resulting mixture was refluxed for three hours. The reaction mixture was then evaporated in vacuo, and the oily residue was caused to crystallize by trituration with water. The crystalline mass was then recrystallized from aqueous 90% methanol. 3.0 gm. (58% of theory) of a white crystalline substance having a melting point of 94–95° C. were obtained. It was identified to be the compound of the formula

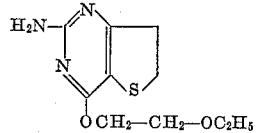

*Analysis.*—C₁₀H₁₅N₃O₂S; molecular weight 241.32. Calculated: C, 49.77%; H, 6.26%; S, 13.29%. Found: C, 49.85%; H, 6.17%; S, 13.37%.

EXAMPLE 6

*Preparation of 2-amino-4-ethylmercapto-7-methyl-dihydrothieno[3,2-d]pyrimidine*

4.0 gm. (0.02 mol) of 2-amino-4-mercapto-7-methyl-dihydrothieno[3,2-d]pyrimidine were dissolved in 60 cc. of 2 N sodium hydroxide. 10.9 gm. (0.1 mol) of ethylbromide were added to the solution, and the resulting mixture was refluxed for two hours. The oil which separated out during that time was taken up in chloroform, the chloroform phase was separated and washed several times with water and thereafter dried over sodium sulfate. The chloroform was then evaporated in vacuo, leaving a crystalline residue which was recrystallized from methanol. 2.7 gm. (59% of theory) of the compound of the formula

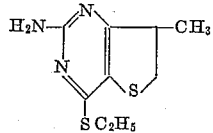

were obtained. It had a melting point of 82–84° C.

*Analysis.*—$C_9H_{13}N_3S_2$; molecular weight 227.36. Calculated: C, 47.54%; H, 5.76%; S, 28.20%. Found: C, 47.35%; H, 5.72%; S, 28.04%.

The compounds of the present invention, that is, the dihydrothieno[3,2-d]pyrimidines embraced by Formula I above, their non-toxic pharmacologically acceptable acid addition salts, and their alkali metal salts have useful properties. More particularly, the compounds of the present invention exhibit cardiovascular, and sedative, activities. The term "cardiovascular" includes both coronary vascular dilating and peripheral vascular dilating activities.

Typical examples of pharmacologically acceptable non-toxic acid addition salts are the hydrochlorides, hydrobromides, hydroiodides, sulfates, phosphates, nitrates, acetates, propionates, butyrates, valerates, oxalates, malonates, succinates, maleates, fumarates, lactates, tartrates, citrates, malates, benzoates, phthalates, cinnamates, salicylates, nicotinates, 2-furoates, 8-chlorotheophyllinates and the like.

For pharmacological purposes, the compounds of the present invention may be administered perorally or parenterally as active ingredients in customary dosage unit compositions, that is, compositions consisting essentially of an inert, physiologically compatible carrier having distributed therein one dosage unit of the active ingredient. One dosage unit of the compounds of the present invention is 10 to 200 mgm, preferably 20 to 100 mgm. Typical examples of such dosage unit compositions are tablets, coated pills, hypodermic solutions, rectal suppositories, suspensions or solutions adapted for administration per os, gelatin capsules, wafer capsules and the like.

The following examples illustrate various dosage unit compositions comprising compounds of the present invention as active ingredients. The parts are parts by weight unless otherwise specified.

EXAMPLE 7

*Coated pills*

The pill cores are compounded from the following ingredients:

| | Parts |
|---|---|
| 2 - amino - 4 - morpholino - dihydro - thieno[3,2-d] pyrimidine | 25.0 |
| Second. calcium phosphate | 75.0 |
| Corn starch | 21.0 |
| Gelatin | 4.0 |
| Talcum | 4.0 |
| Magnesium stearate | 1.0 |
| Total | 130.0 |

Compounding procedure:

The dihydrothieno-pyrimidine compound, the calcium phosphate and the corn starch are admixed with each other, and the mixture is moistened with an aqueous 14% solution of the gelatin. The moist mixture is granulated by passing it through a 1.5 mm.-mesh screen. The moist granulate is dried at 40° C. and is again passed through the screen. The dry granulate is admixed with the talcum and the magnesium stearate, and the mixture is pressed into 130 mgm. tablets, which are then provided with a coating consisting essentially of sugar and talcum. The coated pills are then polished with beeswax. Each pill weighs about 200 mgm. and contains 25 mgm. of the active ingredient.

EXAMPLE 8

*Hypodermic solution*

The solution is compounded from the following ingredients:

| | Parts |
|---|---|
| 2 - amino - 4 - (N' - methyl - piperazino) - dihydrothieno[3,2-d]pyrimidine | 10.0 |
| Tartaric acid | 10.00 |
| Polyethyleneglycol 600 | 100.0 |
| Distilled water q.s. ad, (by vol.) | 2000.0 |

Compounding procedure:

The polyethyleneglycol is melted and is admixed with about double its volume of distilled water. The mixture is then heated to 80° C. and the tartaric acid and the dihydrothieno-pyrimidine compound are dissolved therein one after the other. The mixture is then cooled to room temperature, diluted with distilled water to the desired volume, and the solution is filtered until free from suspended particles. The filtered solution is filled into brown 2 cc. ampules, which are then sterilized for 30 minutes at 100° C. and sealed. Each ampule contains 10 mgm. of the active ingredient. All of the above operations must be carried out in an atmosphere of nitrogen and under exclusion of strong, direct light.

EXAMPLE 9

*Drop solution for peroral administration*

The solution is compounded from the following ingredients:

| | Parts |
|---|---|
| 2 - amino - 4 - (N' - methyl - piperazino) - dihydrothieno [3,2-d]pyrimidine | 10.0 |
| Tartaric acid | 10.0 |
| Cane sugar | 350.0 |
| Sorbic acid | 1.0 |
| Cocoa essence | 50.0 |
| Ethanol, (by vol.) | 200.0 |
| Polyethyleneglycol 600, (by vol.) | 100.0 |
| Distilled water q.s. ad, (by vol.) | 1000.0 |

Compounding procedure:

The sorbic acid is dissolved in the ethanol, and an equal amount of distilled water is added to the solution. The dihydrothieno-pyrimidine compound and the tartaric acid are dissolved in the aqueous solution while stirring (solution A). The cane sugar is dissolved in the residual amount of water (solution B). Solution B, the polyethyleneglycol and the essence of cocoa are added to solution A while stirring. The resulting mixed solution is then filtered through a suitable filter. 1 cc. of the solution contains 10 mgm of the active ingredient.

EXAMPLE 10

*Tablets*

The tablets are compounded from the following ingredients:

| | Parts |
|---|---|
| 2-amino-4-piperidino-7-methyl - dihydrothieno[3,2-d]pyrimidine | 100.0 |
| Lactose | 80.0 |
| Potato starch, undried | 10.0 |
| Potato starch, dried | 16.0 |
| Polyvinylpyrrolidone | 10.0 |
| Colloidal silicic acid | 2.0 |
| Magnesium stearate | 2.0 |
| Total | 220.0 |

Compounding procedure:

The dihydrothieno-pyrimidine compound, the lactose and dried potato starch are admixed with each other, and the mixture is moistened with a 20% aqueous solution of the polyvinyl-pyrrolidone. The moistened mixture is then granulated by passing it through a 1.5 mm.-mesh screen, and the moist granulate is dried at 40° C. The dry granulate is once again passed through the screen, and then the remainder of the ingredients are added and thoroughly admixed. The resulting mixture is pressed into tablets each weighing 220 mgm. Each tablet contains 100 mgm. of the active ingredient.

EXAMPLE 11

*Suppositories*

The suppositories are compounded from the following ingredients:

| | Parts |
|---|---|
| 2-amino-4-methylamino - 7 - methyldihydrothieno [3,2-d]pyrimidine | 200.0 |
| Suppository base (cocoa butter) | 1550.0 |
| Total | 1750.0 |

Compounding procedure:

The suppository base is melted and cooled to 37° C. and the finely powdered dihydrothieno-pyrimidine compound is stirred into it. The mixture is homogenized and poured into cooled suppository molds each holding 1750 mgm. of the mixture. Each suppository contains 200 mgm. of the active ingredient.

EXAMPLE 12

*Gelatin capsules*

The contents of the capsules are compounded from the following ingredients:

| | Parts |
|---|---|
| 2-amino-4-(2-ethoxy-ethoxy) - dihydrothieno[3,2-d]pyrimidine | 20.0 |
| Lactose | 60.0 |
| Colloidal silicic acid | 20.0 |
| Total | 100.0 |

Compounding procedure:

The dihydrothieno-pyrimidine compound is thoroughly admixed with the other ingredients, and the mixture is forced through a 1.0 mm.-mesh screen. The screened mixture is then filled into gelatin capsules each holding 100 mgm. of the mixture. Each capsule contains 20 mgm. of the active ingredient.

Although the dosage unit composition examples given above illustrate only a limited number of the compounds of the invention as active ingredients, it should be understood that any of the other compounds embraced by Formula I or their non-toxic acid addition or alkali metal salts may be substituted for the particular compounds used as active ingredients in Examples 7 to 12. However, it should be understood that the quantities of the active ingredients in the illustrative dosage unit compositions may be varied within the dosage unit range limits indicated above to meet particular requirements.

While the present invention has been illustrated with the aid of certain specific embodiments thereof, it will be readily apparent to others skilled in the art that the invention is not limited to these embodiments, and that various changes and modifications may be made without departing from the spirit of the invention or the scope of the appended claims.

We claim:

1. A compound selected from the group consisting of dihydrothieno[3,2-d]pyrimidine substitution products of the formula

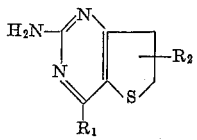

wherein $R_1$ is selected from the group consisting of lower alkoxy-lower alkoxy, lower alkyl-mercapto and

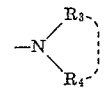

where $R_3$ is selected from the group consisting of hydrogen, amino, lower alkyl, hydroxy-lower alkyl, lower alkoxy-lower alkyl, di(lower alkyl)amino-lower alkyl, lower alkenyl, benzyl and cyclohexyl and $R_4$ is selected from the group consisting of hydrogen, lower alkyl and hydroxy-lower alkyl, and $R_3$ and $R_4$, together with each other and the adjacent nitrogen atom, form a basic heterocycle selected from the group consisting of morpholino, piperidino, pyrrolidino, 2-methyl-morpholino and N'-methyl-piperazino, and $R_2$ is selected from the group consisting of hydrogen and methyl, and their non-toxic, pharmacologically acceptable acid addition salts.

2. 2-amino - 4 - ethylamino - dihydrothieno[3,2-d]pyrimidine.

3. 2-amino-4-isopropylamino - dihydrothieno[3,2 - d]pyrimidine.

4. 2 - amino-4-ethanolamino - dihydrothieno[3,2 - d]pyrimidine.

5. 2-amino-4-isoamylamino - dihydrothieno[3,2-d]pyrimidine.

6. 2-amino-4-(2' - methyl - morpholino) - 7 - methyl-dihydrothieno[3,2-d]pyrimidine.

References Cited by the Examiner

UNITED STATES PATENTS 3,244,594  4/1966  Csaba et al. _____ 167—74

ALEX MAZEL, *Primary Examiner.*

JOSE TOVAR, *Assistant Examiner.*